(12) United States Patent
Yamamoto

(10) Patent No.: US 8,425,333 B2
(45) Date of Patent: Apr. 23, 2013

(54) TORQUE LIMITER

(75) Inventor: Takashi Yamamoto, Kuwana (JP)

(73) Assignee: NTN Corporation, Osaka (JP)

( * ) Notice: Subject to any disclaimer, the term of this patent is extended or adjusted under 35 U.S.C. 154(b) by 79 days.

(21) Appl. No.: 13/122,415

(22) PCT Filed: Oct. 2, 2009

(86) PCT No.: PCT/JP2009/067229
§ 371 (c)(1),
(2), (4) Date: Apr. 4, 2011

(87) PCT Pub. No.: WO2010/041597
PCT Pub. Date: Apr. 15, 2010

(65) Prior Publication Data
US 2011/0192694 A1    Aug. 11, 2011

(30) Foreign Application Priority Data

Oct. 8, 2008    (JP) .................................. 2008-261873

(51) Int. Cl.
*F16D 43/20*    (2006.01)
(52) U.S. Cl.
USPC ........................................................ 464/40
(58) Field of Classification Search .................... 464/40; 192/41 S
See application file for complete search history.

(56) References Cited

U.S. PATENT DOCUMENTS

| 5,620,372 | A  | * | 4/1997 | Takada et al. | ................... | 464/40 |
| 7,318,776 | B2 | * | 1/2008 | Honda         | ............................. | 464/40 |
| 7,354,346 | B2 | * | 4/2008 | Takada et al. |  |  |

FOREIGN PATENT DOCUMENTS

| JP | 43-11622   |   | 5/1968  |
| JP | 4-111925   |   | 4/1992  |
| JP | 05296259   | * | 11/1993 |
| JP | 9-264332   |   | 10/1997 |
| JP | 09264332   | * | 10/1997 |
| JP | 10-184720  |   | 7/1998  |
| JP | 10184720   | * | 7/1998  |
| JP | 2006-170307|   | 6/2006  |
| JP | 2006170307 | * | 6/2006  |

OTHER PUBLICATIONS

International Search Report issued Dec. 22, 2009 in International (PCT) Application No. PCT/JP2009/067229.

* cited by examiner

*Primary Examiner* — Gregory Binda
*Assistant Examiner* — Josh Skroupa
(74) *Attorney, Agent, or Firm* — Wenderoth, Lind & Ponack, LLP.

(57) ABSTRACT

In a spring type torque limiter, it is proposed to prevent cut end portions of a coil spring fitted on an inner ring from causing chatter of the torque limiter, even if the cut end portions of the coil spring are separated from a radially outer surface of the inner ring in order to prevent burrs remaining on the cut end portions of the coil spring from contacting the radially outer surface of the inner ring. The first cut end portion of the coil spring fitted on the inner ring is inserted in a recess of a first spring receiving protrusion formed on the radially inner surface of the outer annular member. The second cut end portion is inserted in a recess of a second spring receiving protrusion formed on the inner surface of the lid member, thereby restraining the first and second cut end portions with the recesses.

20 Claims, 11 Drawing Sheets

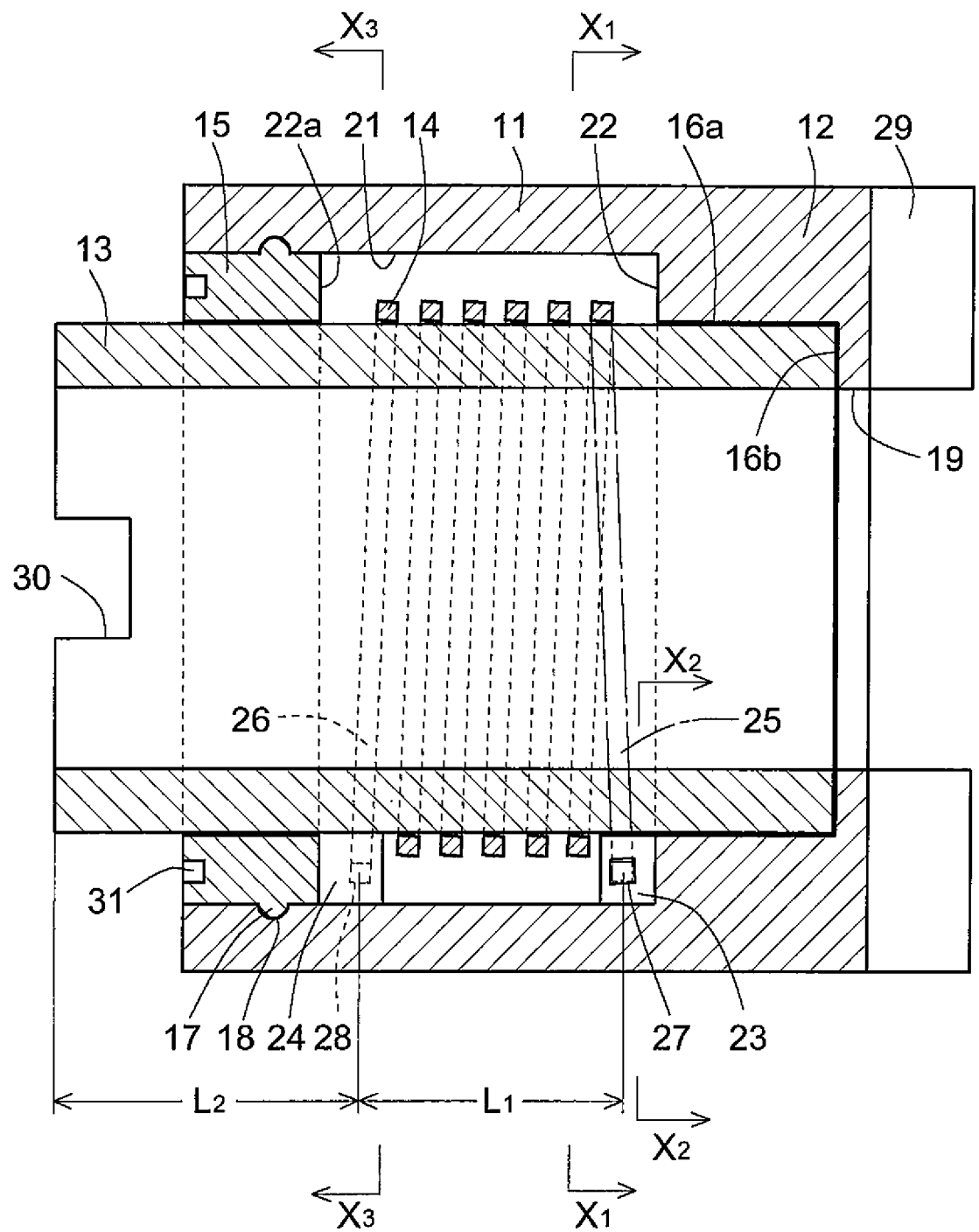

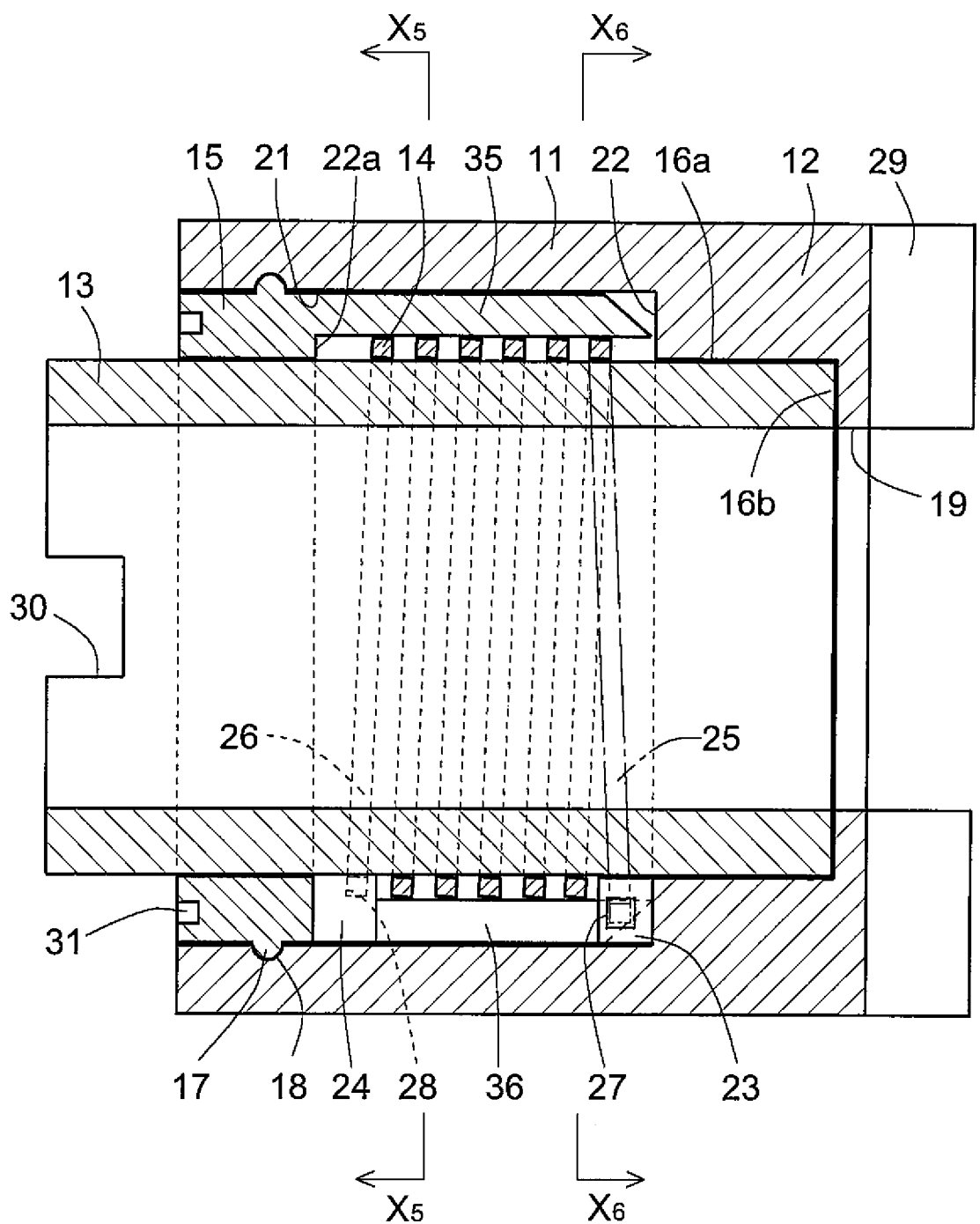

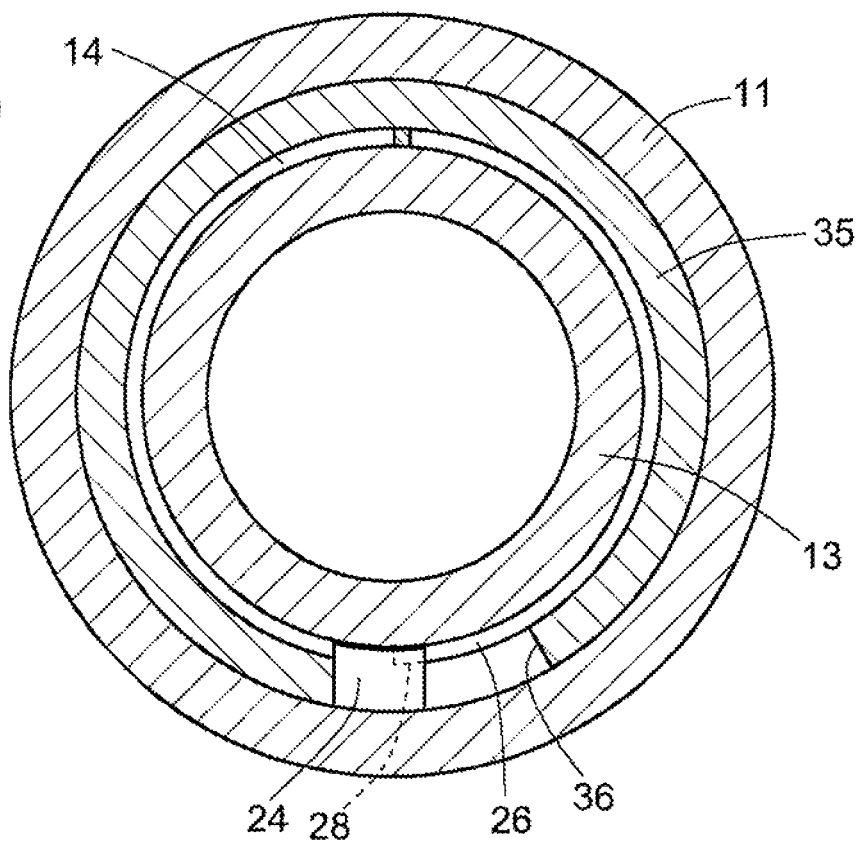
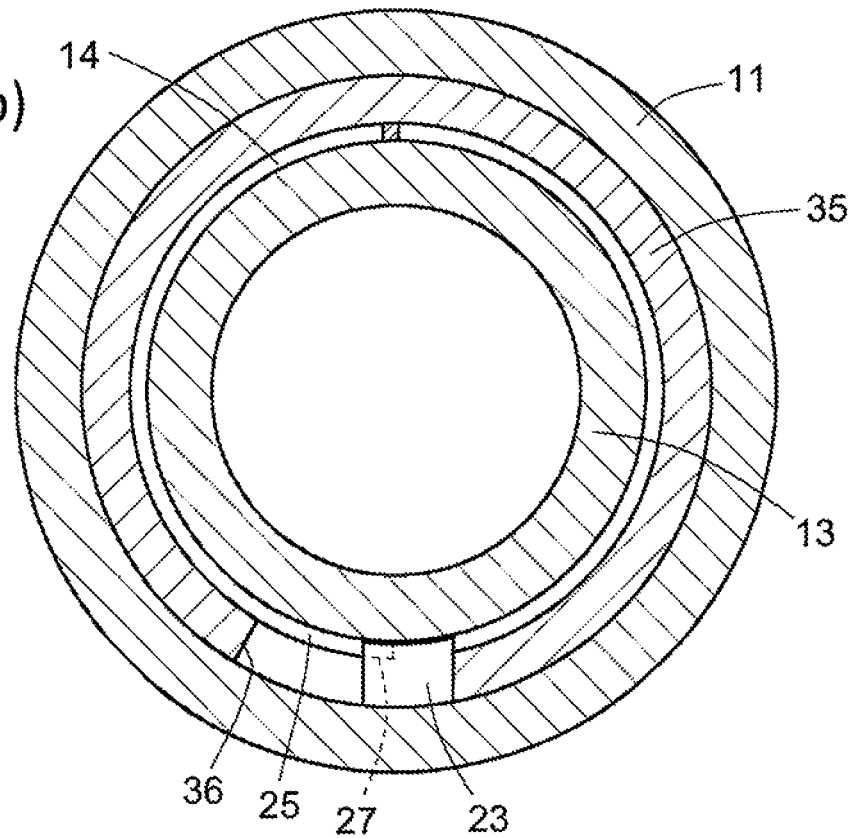

TORQUE LIMITER

TECHNICAL FIELD

This invention relates to a torque limiter used in e.g. a paper feed unit of a printer, a copier, etc.

BACKGROUND ART

A typical conventional torque limiter of this type includes an outer annular member, an inner ring received in the outer annular member and rotatably supported by a boss portion provided at one end of the outer annular member, a coil spring having a constant diameter and fitted on the radially outer surface of the inner ring with an interference fit, and a lid member fitted in the radially inner surface of the outer annular member at the other end thereof, thereby closing the gap between the radially inner surface of the outer annular member and the radially outer surface of the inner ring (see JP Patent Publication 2006-170307A).

The coil spring of this torque limiter has its two cut end portions in engagement with the outer annular member and the lid member, respectively, thereby generating required torque when the inner ring and the outer annular member rotate relative to each other and the coil spring is radially expanded.

Since the coil spring comprises a coil having a constant diameter and comprising a steel wire having both ends simply cut perpendicular to the axis of the wire without forming radially bent hooks at both ends of the coil, the entire torque limiter is sufficiently small in size.

SUMMARY OF THE INVENTION

Since the steel wire forming the coil spring of this conventional torque limiter has its ends cut perpendicular to its axis, burrs may remain at the cut end surfaces. If the coil spring is fitted with an interference fit on the radially outer surface of the inner ring with burrs remaining at the cut end surfaces, the burrs may damage the radially outer surface of the inner ring, or could cause noise.

One way to avoid this problem would be to provide the coil spring with end portions having a larger radius of curvature so that both end portions are radially spaced from the radially outer surface of the inner ring, thereby preventing burrs that remain at the cut end surfaces from contacting the radially outer surface of the inner ring.

But in this arrangement, since both end portions of the coil spring are not restrained at all, they tend to vibrate, which can cause chatter of the torque limiter.

An object of the present invention is to arrange both end portions of the coil spring separated from the radially outer surface of the inner ring, while preventing vibration of both end portions of the coil spring, thereby preventing chatter of the torque limiter.

In order to achieve this object, the present invention provides a torque limiter comprising an outer annular member 11, an inner ring 13 inserted in and rotatably supported by the outer annular member, a coil spring 14 fitted around a radially outer surface of the inner ring 13 with an interference fit, and a lid member 15 fitted to a radially inner surface of the outer annular member 11 at a first end thereof, thereby closing a gap between the radially inner surface of the outer annular member and the radially outer surface of the inner ring 13, wherein the coil spring 14 has first and second cut end portions (first and second cut end surfaces) 25 and 26 which are engaged with the outer annular member 11 and the lid member 15, respectively, whereby a predetermined torque is generated due to radial expansion of the coil spring 14 when the outer annular member 11 and the inner ring 13 rotate relative to each other. The first and second cut end portions 25 and 26 of the coil spring 14 are radially spaced from the radially outer surface of the inner ring 13 with the coil spring 14 fitted on the inner ring 13, and the cut end portions 25 and 26 are restrained by first and second restraining means formed on the outer annular member 11 and the lid member 15, respectively.

The first restraining means may comprise a first spring receiving protrusion 23 formed on the radially inner surface of the outer annular member 11 and formed with a recess 27 facing the first cut end portion 25 of the coil spring 14.

The second restraining means may comprise a second spring receiving protrusion 24 formed on an inner surface of the lid member 15 and formed with a recess 28 facing the second cut end portion 26 of the coil spring 14.

With this arrangement, the first and second cut end portions 25 and 26 are restrained by inserting the first and second cut end portions into the respective recesses 27 and 28. Thus, their vibration is reduced.

According to this invention, the first and second cut end portion 25 and 26 of the coil spring 14, which are separated from the radially outer surface of the inner ring 13, are restrained by the first and second restraining means such as the first and second spring receiving protrusions 23 and 24, which are provided on the outer annular member and the lid member. Thus, it is possible to reduce vibration of the cut end portions 25 and 26, which in turn makes it possible to prevent chatter of the torque limiter while it is rotating. This improves stability of the torque limiter.

BRIEF DESCRIPTION OF THE DRAWINGS

FIG. 1 is a sectional view of Embodiment 1.

FIG. 9 is a sectional view of Embodiment 5.

FIG. 10(a) is a sectional view taken along line $X_5$-$X_5$ of FIG. 9; and FIG. 10(b) is a sectional view taken along line $X_6$-$X_6$ of FIG. 9.

DETAILED DESCRIPTION OF THE INVENTION

Now the torque limiters embodying the present invention are described with reference to the drawings.

Embodiment 1

Figure 2A:
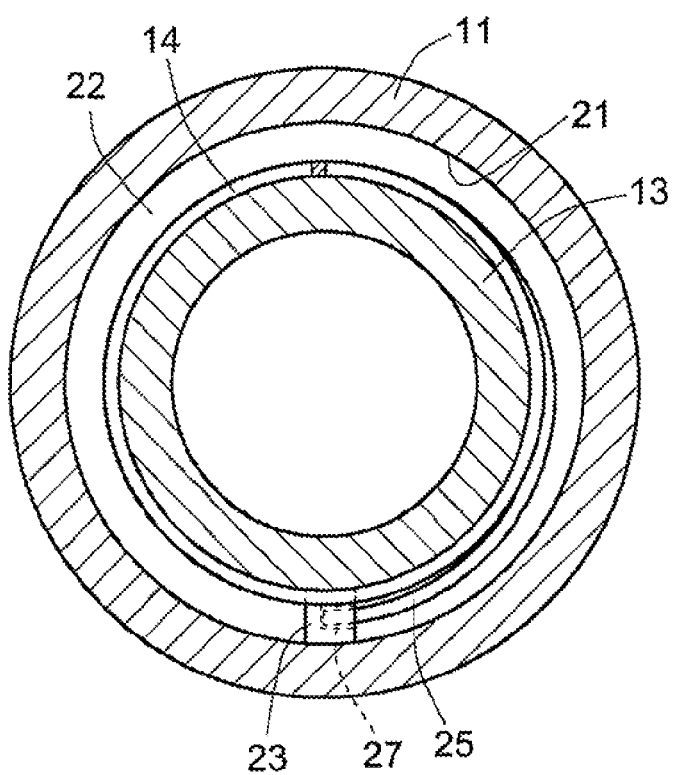
FIG. 2(a) is a sectional view taken along line $X_1$-$X_1$ of FIG. 1.
Figure 2B:
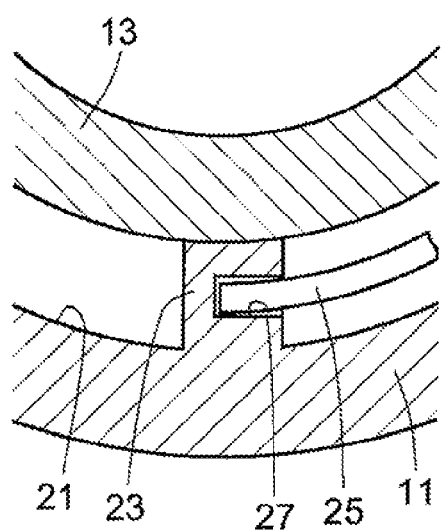
FIG. 2(b) is a sectional view taken along line $X_2$-$X_2$ of FIG. 1.
Figure 2C:
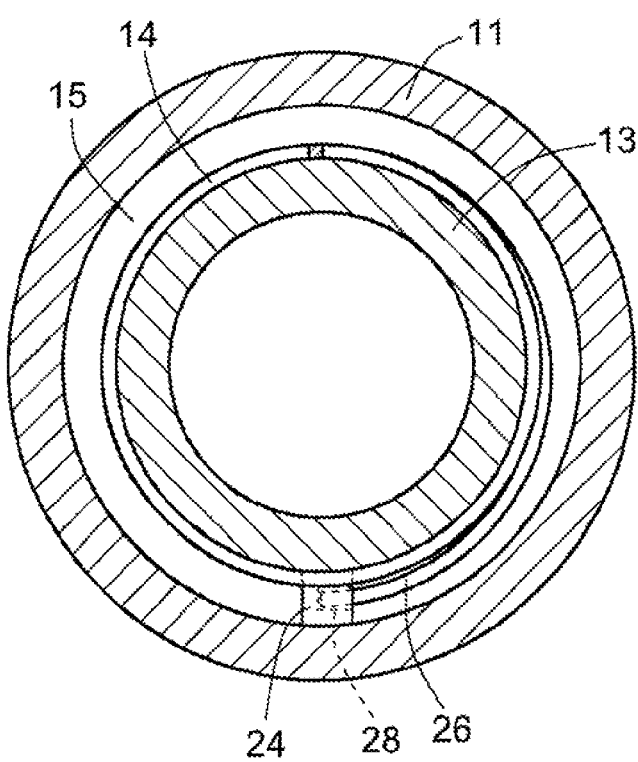
FIG. 2(c) is a sectional view taken along line $X_3$-$X_3$ of FIG. 1.
Figure 3:
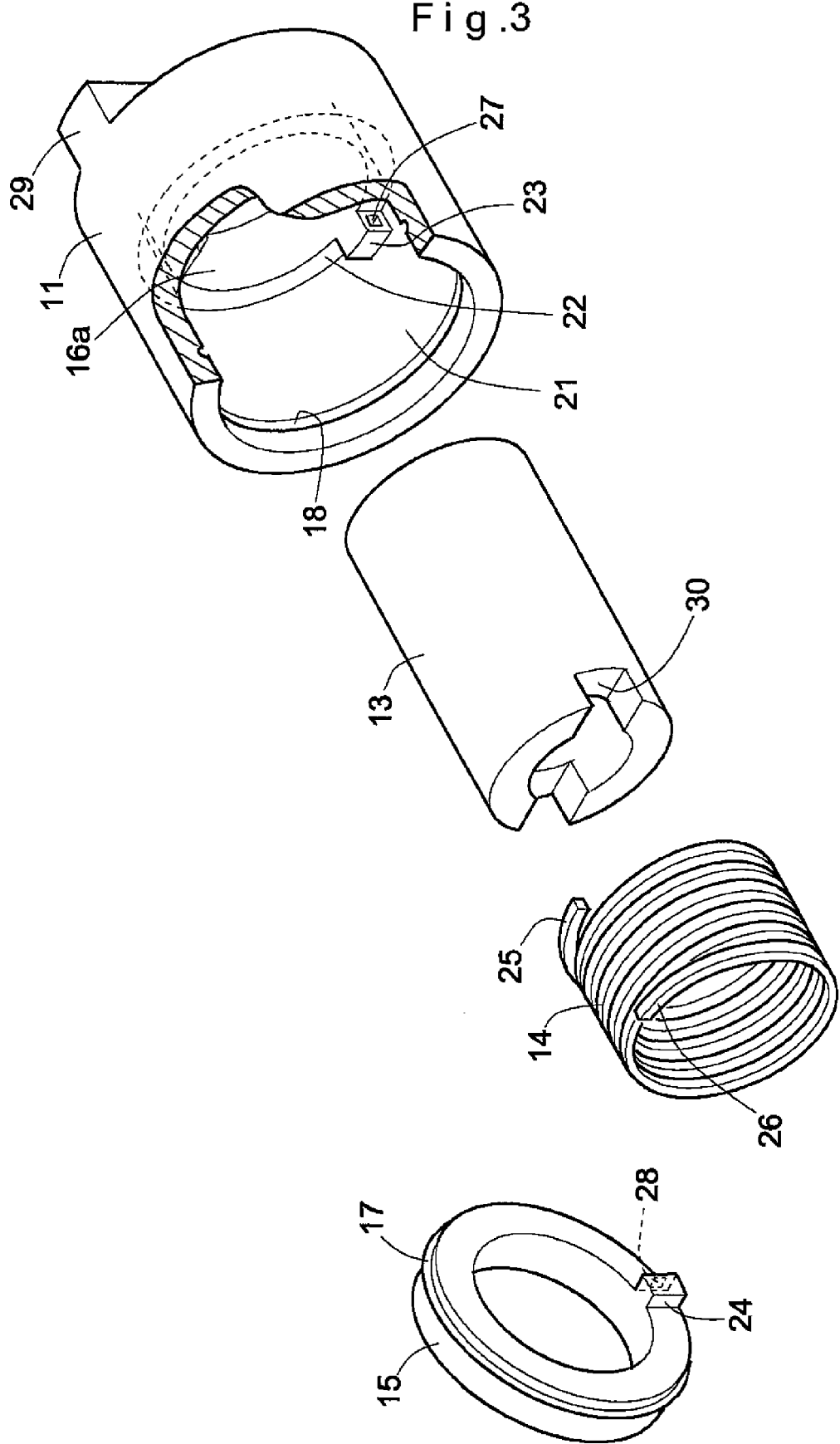
FIG. 3 is an exploded perspective view of Embodiment 1.

The torque limiter of Embodiment 1, which is shown in FIGS. 1 to 3, comprises an outer annular member 11 having a boss portion 12 at one end thereof, an inner ring 13 inserted in the outer annular member 11 and rotatably supported by the boss portion 12, a coil spring 14 having a constant diameter and fitted with an interference fit on the radially outer surface of the inner ring 13, and a lid member 15 fitted on the radially inner surface of the outer annular member 11 at its other end and closing the space between the radially inner surface of the outer annular member and the radially outer surface of the inner ring.

The radially inner surface of the boss portion 12 comprises a shoulder 22, a radial bearing portion 16a provided between the shoulder 22 and the one end of the outer annular member, and a thrust bearing portion 16b provided between the radial bearing portion 16a and the one end of the outer annular member. The inner ring 13 has its one end portion relatively rotatably supported by the bearing portions 16a and 16b.

The other end portion of the inner ring 13 extends through the radially inner surface of the lid member 15 and protrudes to the outside. An engaging rib 17 formed on the radially outer surface of the lid member 15 is engaged in an engaging groove 18 formed on the radially inner surface of the outer annular member 11. A shaft hole 19 is defined by the radially inner surface of the boss portion 12 of the outer annular member 11.

A first spring receiving protrusion 23 is formed on the outer annular member 11 at a corner defined by the radially inner surface 21 of the outer annular member 11 and its shoulder 22 (see FIGS. 2(a) and 3). A second spring receiving protrusion 24 is formed on the inner surface of the lid member 15. The first and second spring receiving protrusions 23 and 24 have recesses 27 and 28 having circumferentially facing openings, respectively, for receiving the respective cut end portions 25 and 26 of the coil spring 14.

The first and second spring receiving protrusions 23 and 24 correspond to a "first restraining means" and a "second restraining means", respectively.

The coil spring 14 is formed by winding a wire having a square or rectangular cross-section so as to have a constant diameter except its cut end portions 25 and 26 including the cut end surfaces, which are circular or oval portions having a radius of curvature larger than the radius of the remaining constant-diameter portion (torque-generating portion) of the coil spring and each extend the angular range of about 180° (see FIGS. 2(a) and 2(c)).

With the coil spring fitted around the inner ring 13 with an interference fit, the cut end portions 25 and 26 are radially outwardly separate from and thus kept out of contact with the radially outer surface of the inner ring 13. Thus, any burrs that may be produced on the cut end surfaces never contact the inner ring 13.

With the coil spring 14 fitted around the inner ring 13, the axial distance $L_1$ between the ends of the coil spring 14 is equal to the axial distance between the recess 27 of the first spring receiving protrusion 23 and the recess 28 of the second spring receiving protrusion 24 (see FIG. 1). The coil spring 14 is fitted on the inner ring 13 such that the axial distance between the end surface of the inner ring 13 where an engaging recess 30 is formed and the end surface of the cut end portion 26 is a predetermined distance $L_2$.

To assemble this torque limiter, with the coil spring 14 fitted on the inner ring 13 in the above manner, the lid member 15 is fitted on the inner ring 13 so that the free end of the cut end portion 26 is inserted into the recess 28 of the second spring receiving protrusion 24. In this state, with the end of inner ring 13 that is formed with the engaging recess 30 facing downward, the inner ring 13 is fitted on an assembling jig together with the lid member 15. Then, the outer annular member 11 is fitted on the inner ring 13 from over the inner ring 13 until the engaging rib 17 of the lid member 15 is engaged in the engaging groove 18 of the outer annular member 11. In this state, when the outer annular member 11 is rotated in the winding direction of the coil spring 14 (clockwise in the figures), the cut end portion 25 is inserted into the recess 27 of the first spring receiving protrusion 23.

In the drawings, numeral 29 designates a pair of engaging protrusions formed at the end of the boss portion 12 of the outer annular member 11. Numeral 31 shows tool engaging recesses formed on the outer end surface of the lid member 15.

With this torque limiter, when the outer annular member 11 and the inner ring 13 rotate relative to each other in either direction, the free end of the cut end portion 25 or 26 abuts the recess 27 or 28 and the coil spring 14 is radially expanded, producing a predetermined torque.

In this state, since the cut end portions 25 and 26 of the coil spring 14 contact and are restrained by the respective recesses 27 and 28 (see FIG. 2(b)). This reduces vibration due to rotation of the torque limiter.

Embodiment 2

Figure 4:
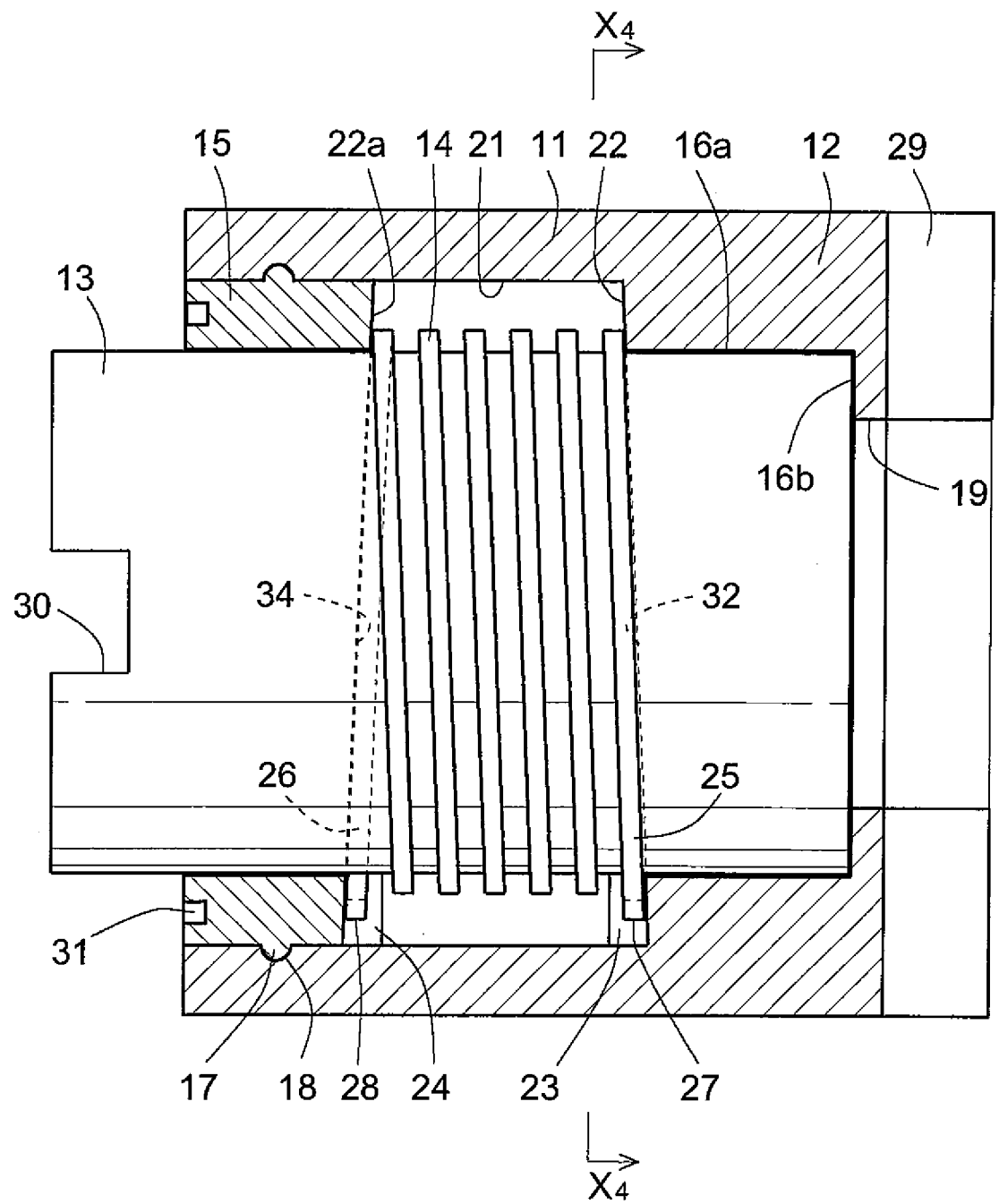
FIG. 4 is a sectional view of Embodiment 2.
Figure 5:
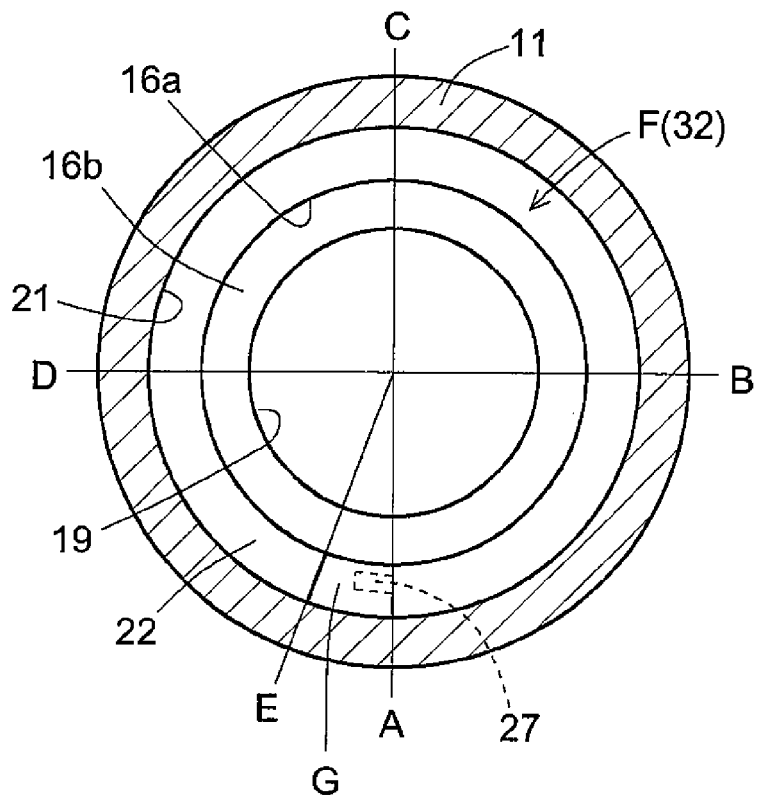
FIG. 5 is a sectional view taken along line $X_4$-$X_4$ of FIG. 4.
Figure 6:
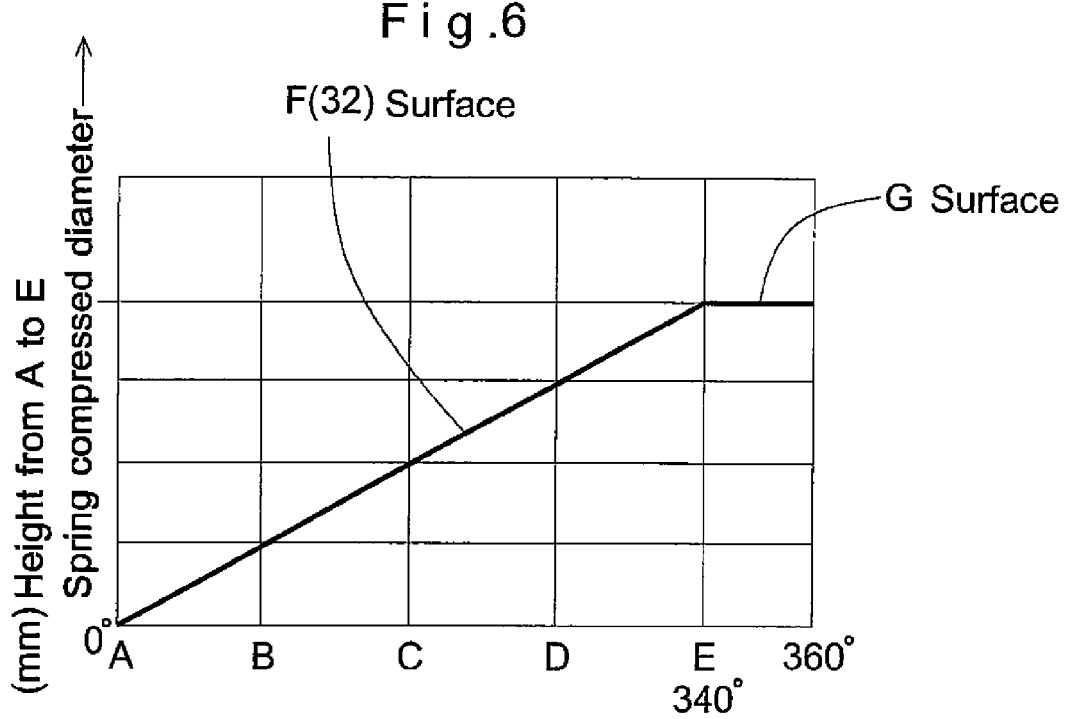
FIG. 6 is a graph explaining helical surfaces of Embodiment 2.

The torque limiter of Embodiment 2, shown in FIGS. 4 to 6, is basically of the same structure as Embodiment 1. In particular, as in Embodiment 1, the coil spring 14 is restrained by inserting its cut end portions 25 and 26 in the first spring receiving protrusion 23 formed on the outer annular member and the second spring receiving protrusion 24 formed on the lid member, respectively, thereby reducing vibration.

But Embodiment 2 further includes the following additional structure for more effectively reducing vibration of the cut end portions 25 and 26.

Specifically, while in Embodiment 1, the shoulder 22 is a flat surface extending perpendicular to the axis, and the end surface of the coil spring 14 is kept out of contact with the shoulder 22, in Embodiment 2, the shoulder 22 is a helical surface 14 extending along one end surface of the coil spring 14.

The inner surface 22a of the lid member 15 also comprises a helical surface 34, which extends along the other end surface of the coil spring 14.

The recesses 27 and 28 of the first and second spring receiving protrusion 23 and 24, which are formed on the respective helical surfaces 32 and 34, are flush with the respective helical surfaces 32 and 34 (see FIG. 4).

The helical surface 32 extends over an angular range of 340 degrees out of one full turn (360 degrees) of the coil spring 14 (see helical surface F (32) in FIGS. 5 and 6, which extends from point A to point E). A flat surface G extends over the remaining 20-degree angular range (from point E to point A). The helical surface 34 on the lid member 15 is identical in configuration to the helical surface 32. Both end surfaces of the coil spring 14, including its cut end portions 25 and 26, are in contact with the respective helical surfaces 32 and 34, respectively.

In this example, since the recesses 27 and 28 of the first and second spring receiving protrusions 23 and 24 are flush with the respective helical surfaces 32 and 34, the cut end portions 25 and 26, which are inserted into the recesses 27 and 28, never separate from the respective helical surfaces 32 and 34.

Since the cut end portions 25 and 26 of the coil spring 14 are restrained by being inserted in the recesses 27 and 28 as in Embodiment 1, and further both end surfaces including the cut end portions 25 and 26 are restrained by being in contact with the respective helical surfaces 32 and 34, vibration is more effectively reduced.

Embodiment 3

FIG. 7 shows a torque limiter of Embodiment 3, which is basically of the same structure as Embodiment 1 but differs from Embodiment 1 in that the natural length a of the coil spring 14 is not equal to its length b when mounted in position.

Figure 7A:
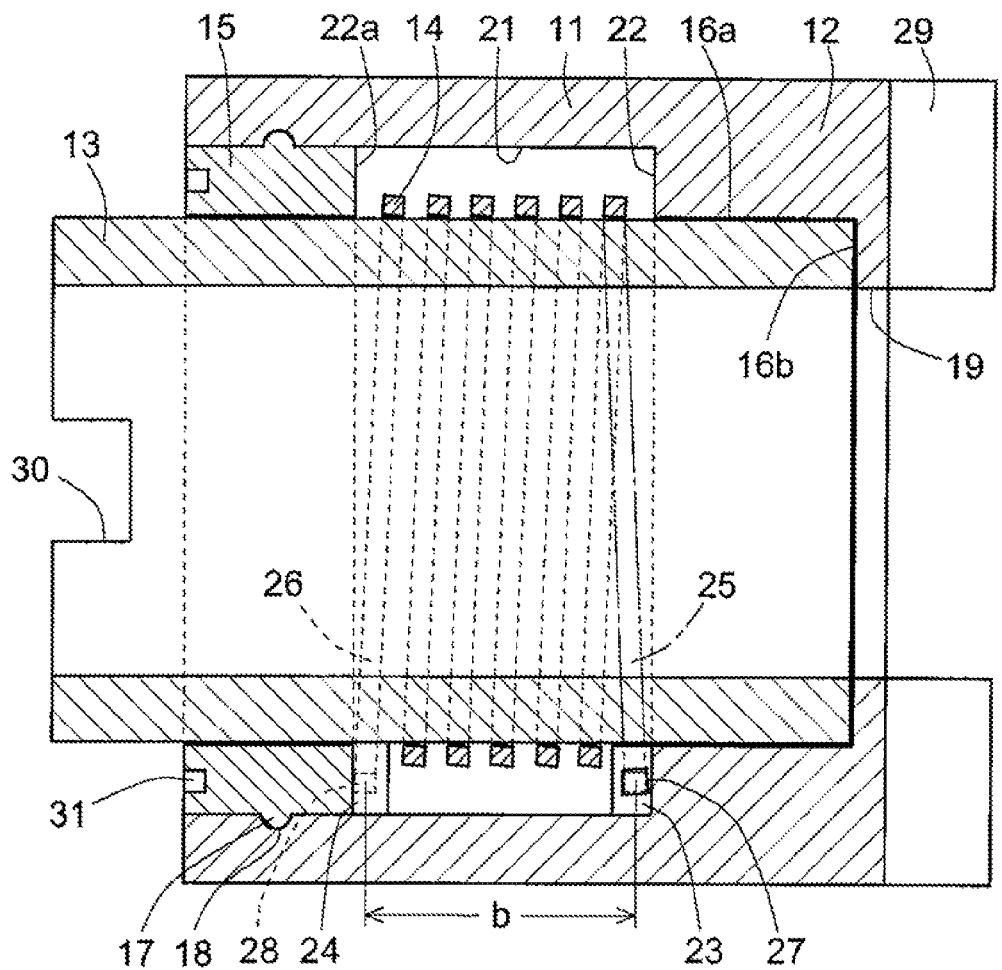
FIG. 7(a) is a sectional view of Embodiment 3.
Figure 7B:
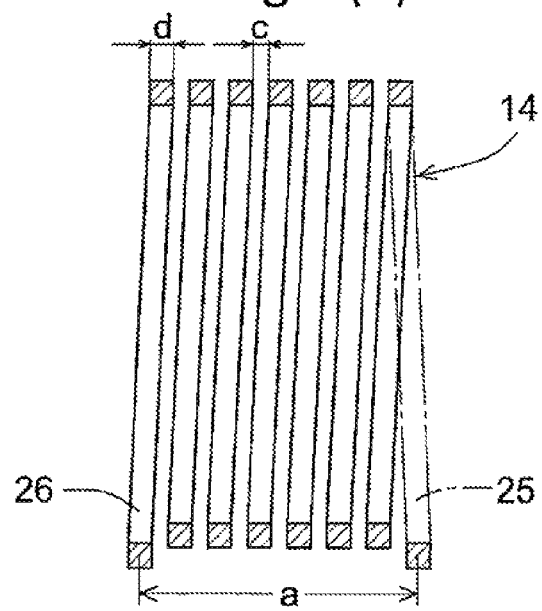
FIG. 7(b) is a sectional view of the coil spring of Embodiment 3.

Specifically, as shown in FIGS. 7(a) and 7(b), the natural length a of the coil spring 14 is larger than the axial distance b between the recess 27 of the first spring receiving protrusion 23 and the recess 28 of the second spring receiving protrusion 24 (a>b). Thus, the coil spring 14 is mounted between the recesses 27 and 28 in an axially compressed state, thus axially biasing the inner surfaces of the recesses 27 and 28. This increases the restraining force of the cut end portions 25 and 26, thereby further effectively reducing vibration compared to Embodiment 1.

The recess 27 of this embodiment includes a surface flush with the shoulder 22. The recess 28 includes a surface flush with the inner surface 22a of the lid member 15. With this arrangement, when the outer annular member 11 is rotated relative to the lid member 15 during assembling, the cut end portions 25 and 26 of the coil spring 14 can be smoothly inserted into the respective recesses 27 and 28.

In this embodiment too, as in Embodiment 2, helical surfaces 32 and 34 may be formed on the shoulder 22 and the inner surface 22a, respectively, so that both end surfaces of the coil spring 14 are in contact with the respective helical surfaces 32 and 34.

Preferably, the pitch c between turns of the wire of the coil spring 14 in a natural state is small than the wire diameter c (c<d). This prevents tangling of the coil spring 14 when mounting, thus ensuring smooth mounting of the spring 14.

Embodiment 4

Figure 8:
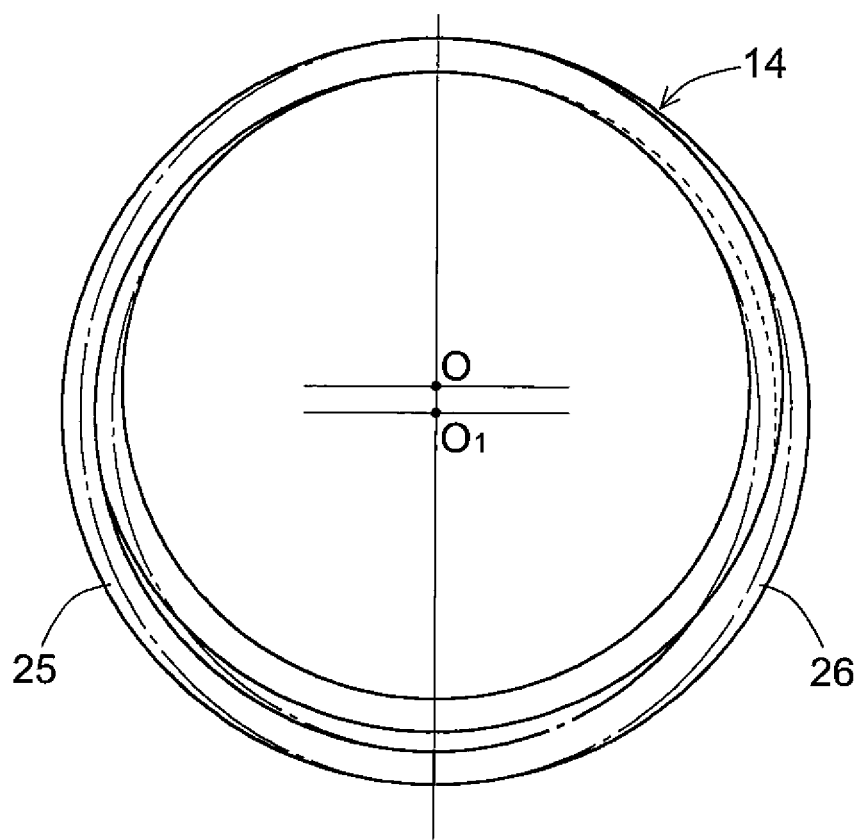
FIG. 8 is an enlarged plan view of the coil spring of Embodiment 4.

Embodiment 4 is directed to the shape of the cut end portions 25 and 26 of the coil spring 14. In Embodiments 1 to 3, the curved shape of the cut end portions 25 and 26 is not limited and may be a part of an ellipse. In FIG. 8, the cut end portions 25 and 26 shown by one-dot chain line each form a part of an ellipse.

In Embodiment 4, the cut end portions 25 and 26 of the coil spring 14 each form a semicircle of which the center is located on point $O_1$ which is offset from the center O of the coil spring 14 by a predetermined distance (see solid lines in FIG. 8).

It has been confirmed by an experiment that such circular cut portions 25 and 26 can reduce vibration more effectively than those forming a part of an ellipse.

Embodiment 5

FIGS. 9 to 12 show a torque limiter of Embodiment 5, which, as in the previous embodiments, includes first and second spring receiving protrusions 23 and 24 formed on the annular outer member and the lid member, respectively, and having recesses 27 and 28 in which the cut end portions 25 and 26 of the coil spring 14 are inserted and restrained.

Besides, Embodiment 5 includes means for preventing what is known as backlash, i.e. a time delay in the generation of torque due to partial radial expansion of the coil spring 14 at the initial stage of generation of torque.

In order to prevent such backlash, JP Patent Publication 2006-170307A proposes to provide three circumferentially spaced apart, axial restraining protrusions on each of the opposed surfaces of the outer annular member 11 and the lid member 15 (see e.g. FIGS. 1 and 2 of JP Patent Publication 2006-170307A).

But with this arrangement, when mounting the outer annular member 11 on the inner ring 13 with the inner ring 13 mounted on a jig and the coil spring 14 mounted on the inner ring 13, it is necessary to angularly position the first spring receiving protrusion 23 on the outer annular member 23 relative to the end of the cut end portion 25 of the coil spring 14. This makes it difficult to assemble the torque limiter.

Figure 11:
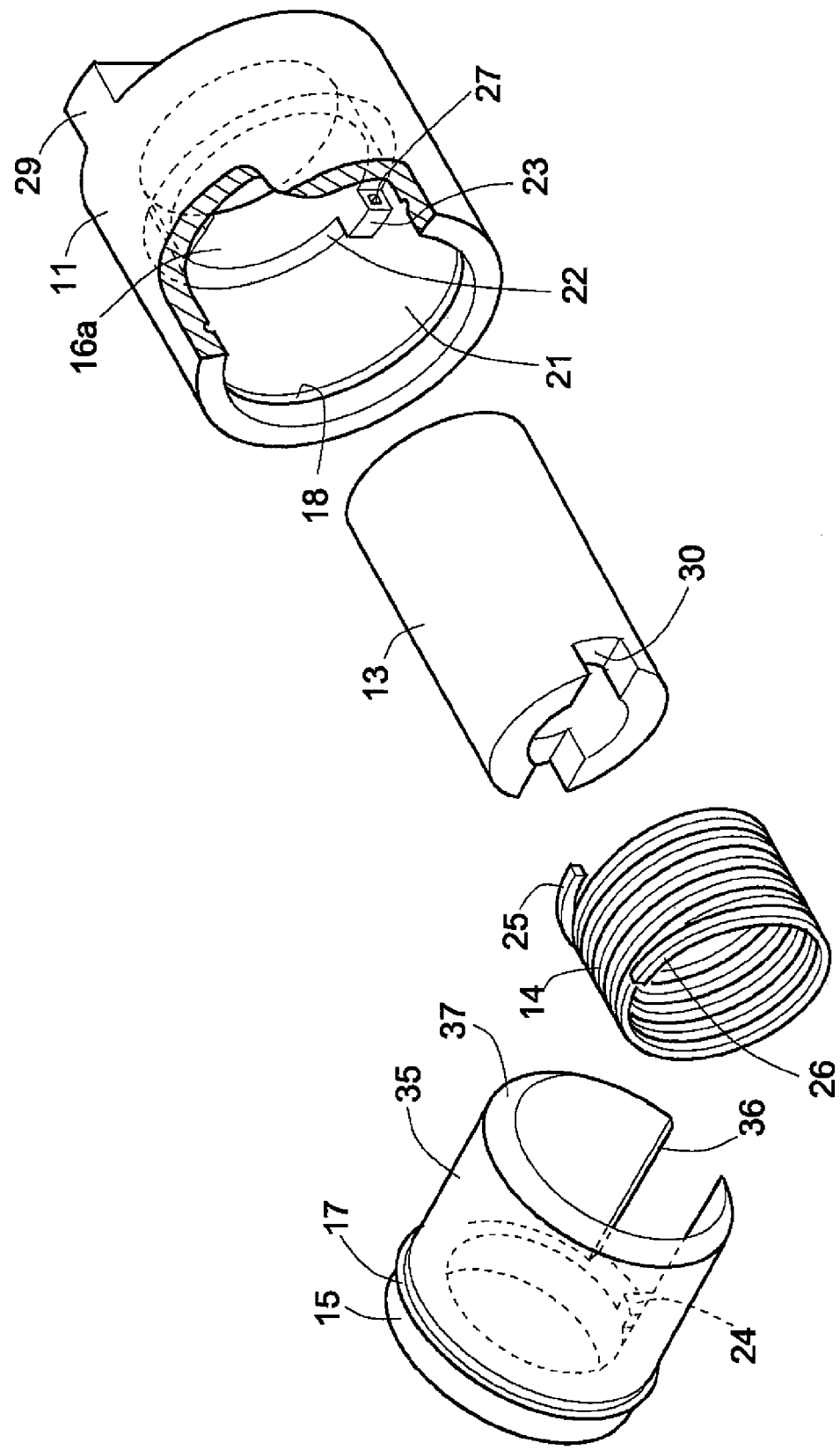
FIG. 11 is an exploded perspective view of Embodiment 5.

In Embodiment 5, as shown in FIGS. 9 and 11, the lid member 15 has a restraining tube 35 on its inner surface 22a so as to be concentric with the lid member 15. The restraining tube 35 has its axial length determined such that its free end is close to the shoulder 22 of the outer annular member 11. As shown in FIG. 11, the restraining tube 35 has a cutout 36 having a predetermined width and including the second spring receiving protrusion 24 so as to extend the entire length thereof. The restraining tube 35 has its free end surface 37 tapered.

A gap of 0.1 to 0.3 mm, preferably about 0.2 mm, is defined between the radially inner surface of the restraining tube 35 and the radially outer surface of the coil spring 14. This gap is determined to a value necessary to restrict radial expansion of the coil spring 14 while not hindering rotation of the tube 35 relative to the coil spring 14.

Figure 12A:
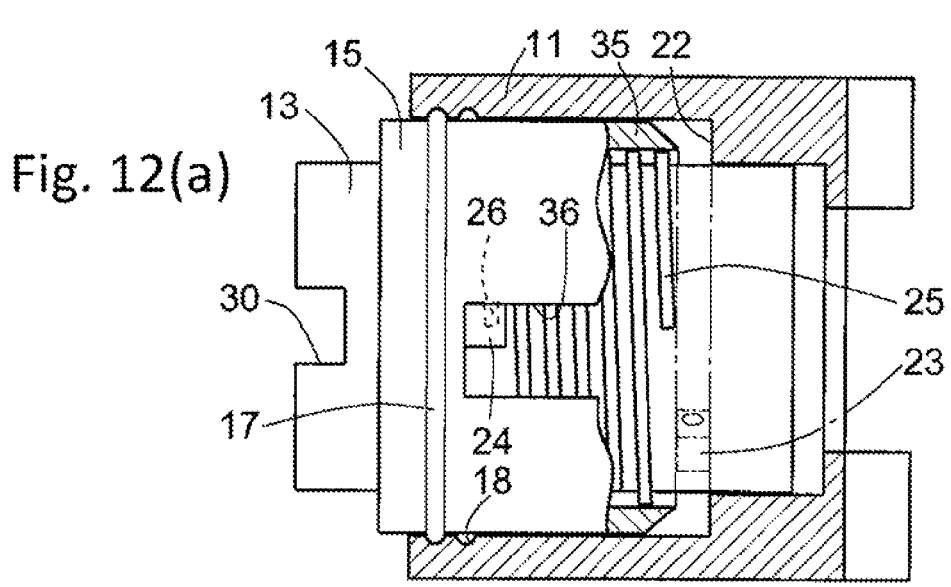
FIGS. 12(a) to 12(c) are sectional views of Embodiment 5 while being assembled.

As shown in FIG. 12(a), the coil spring 14 is fitted in position around the radially outer surface of the inner ring 13, and then is fitted to the lid member 15 such that its cut end portions 25 and 26 are received in the cutout 36 of the restraining tube 35 with the cut end portion 26 inserted into the recess 28 of the second spring receiving protrusion 24. In this state, the cut end portion 25 is located at the open end of the cutout 36. When the outer annular member 11 is fitted around the radially outer surface of the restraining tube 35 in this state, the free end surface of the restraining tube 35 abuts the first bearing receiving protrusion 23.

Figure 12B:
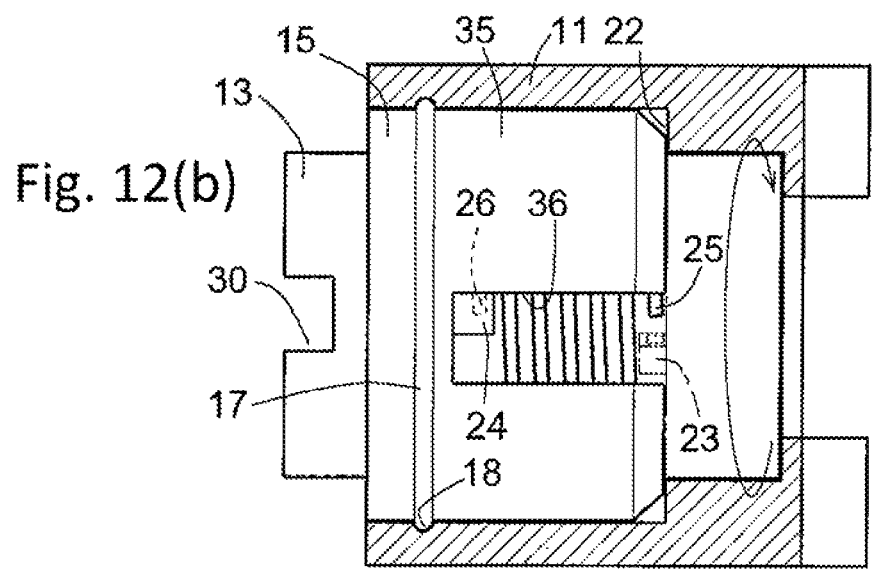
Figure 12C:
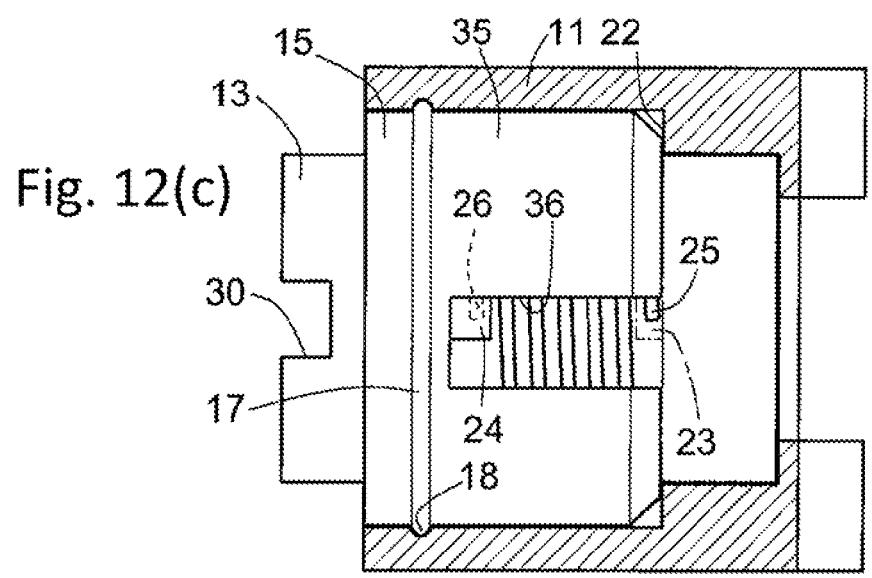

In this state, when, as shown in FIG. 12(b), the annular outer member 11 is rotated by a predetermined angle relative to the inner ring, the first spring supporting protrusion 23 is fitted in the cutout 36. When the annular outer member 11 is further rotated, the cut end portion 25 is inserted into the recess 27 of the first spring supporting protrusion 23.

In Embodiment 5, the restraining tube 35 prevents backlash due to partial radial expansion of the coil spring 14. Simultaneously, vibration is reduced by inserting the cut end portions 25 and 26 of the coil spring 14 in the recesses 27 and 28 of the first and second spring receiving protrusions 27 and 28, respectively.

What is claimed is:

1. A torque limiter comprising:
   an outer annular member;
   an inner ring inserted in and rotatably supported by the outer annular member;
   a coil spring fitted around a radially outer surface of the inner ring with an interference fit; and
   a lid member fitted to a radially inner surface of the outer annular member at a first end thereof, thereby closing a gap between the radially inner surface of the outer annular member and the radially outer surface of the inner ring;
   wherein the coil spring has first and second cut end surfaces which are engageable with the outer annular member and the lid member, respectively, whereby a predetermined torque is generated due to radial expansion of the coil spring when the outer annular member and the inner ring rotate relative to each other;
   wherein both of the first and second cut end surfaces of the coil spring are radially outwardly spaced apart from the radially outer surface of the inner ring with the coil spring fitted on the inner ring;
   wherein the outer annular member has a radially inwardly protruding boss portion at a second end of the outer annular member, the boss portion having a radially inner surface rotatably supporting a second end of the inner ring, and a first spring receiving protrusion provided on the radially inner surface of the outer annular member at the second end thereof and formed with a first circumferentially opening recess that opens circumferentially to circumferentially receive the first cut end surface of the coil spring;

wherein the lid member has a second spring receiving protrusion provided on an axially inner surface of the lid member and formed with a second circumferentially opening recess that opens circumferentially to circumferentially receive the second cut end surface of the coil spring; and wherein the first and second cut end surfaces of the coil spring are engageable in the first and second circumferentially opening recesses, respectively.

2. The torque limiter of claim 1, wherein a shoulder is formed on the radially inner surface of the outer annular member at an axial end of the radially inwardly protruding boss portion, wherein the coil spring has first and second helical end surfaces including the first and second cut end surfaces, and wherein the shoulder and the inner surface of the lid member are formed by first and second helical surfaces which are complementary in shape to the first and second helical end surfaces of the coil spring.

3. The torque limiter of claim 2, wherein the first spring receiving protrusion is formed on the shoulder, and wherein the first and second circumferentially opening recesses of the first and second spring receiving protrusions are flush with the first and second helical surfaces, respectively.

4. The torque limiter of claim 3, wherein the distance (b) between the first and second circumferentially opening recesses of the first and second spring receiving protrusions is shorter than a natural length (a) of the coil spring.

5. The torque limiter of claim 3, wherein the coil spring is formed of a wire, and a pitch (c) of the coil spring in a natural state the coil spring is shorter than a diameter (d) of the wire forming the coil spring.

6. The torque limiter of claim 3, wherein each of the first and second cut end surfaces of the coil spring is located on a circle having a center ($O_1$) which is offset from a center (O) of the coil spring.

7. The torque limiter of claim 2, wherein the distance (b) between the first and second circumferentially opening recesses of the first and second spring receiving protrusions is shorter than a natural length (a) of the coil spring.

8. The torque limiter of claim 2, wherein the coil spring is formed of a wire, and a pitch (c) of the coil spring in a natural state of the coil spring is shorter than a diameter (d) of the wire forming the coil spring.

9. The torque limiter of claim 2, wherein each of the first and second cut end surfaces of the coil spring is located on a circle having a center ($O_1$) which is offset from a center (O) of the coil spring.

10. The torque limiter of claim 1, wherein the distance (b) between the first and second circumferentially opening recesses of the first and second spring receiving protrusions is shorter than a natural length (a) of the coil spring.

11. The torque limiter of claim 10, wherein the coil spring is formed of a wire, and a pitch (c) of the coil spring in a natural state of the coil spring is shorter than a diameter (d) of the wire forming the coil spring.

12. The torque limiter of claim 10, wherein each of the first and second cut end surfaces of the coil spring is located on a circle having a center ($O_1$) which is offset from a center (O) of the coil spring.

13. The torque limiter of claim 1, wherein the coil spring is formed of a wire, and a pitch (c) of the coil spring (14) in a natural state of the coil spring is shorter than a diameter (d) of the wire forming the coil spring.

14. The torque limiter of claim 13, wherein each of the first and second cut end surfaces of the coil spring is located on a circle having a center ($O_1$) which is offset from a center (O) of the coil spring.

15. The torque limiter of claim 1, wherein each of the first and second cut end surfaces of the coil spring is located on a circle having a center ($O_1$) which is offset from a center (O) of the coil spring.

16. The torque limiter of claim 1, wherein the lid member has a restraining tube on an axially inner surface thereof, the restraining tube having an inner diameter larger than an outer diameter of the coil spring and having such a length as to reach the shoulder of the outer annular member.

17. The torque limiter of claim 16, wherein the restraining tube has a cutout having a predetermined width and extending an entire length of the restraining tube.

18. The torque limiter of claim 1, wherein the first circumferentially opening recess of the first spring receiving protrusion opens in a first circumferential direction so as to receive the first cut end surface of the coil spring to limit circumferential movement of the first cut end surface in a second circumferential direction opposite the first circumferential direction; and the second circumferentially opening recess of the second spring receiving protrusion opens in the second circumferential direction so as to receive the second cut end surface of the coil spring to limit circumferential movement of the second cut end surface in the first circumferential direction.

19. The torque limiter of claim 18, wherein the coil spring is disposed radially between the outer annular member and the inner ring, and the coil spring is disposed axially between the boss portion and the lid member.

20. The torque limiter of claim 1, wherein the coil spring is disposed radially between the outer annular member and the inner ring, and the coil spring is disposed axially between the boss portion and the lid member.

* * * * *